United States Patent [19]

Andrews

[11] Patent Number: 4,747,646
[45] Date of Patent: May 31, 1988

[54] OPTICAL HOLOGRAPHIC SCANNER

[75] Inventor: John R. Andrews, Fairport, N.Y.

[73] Assignee: Xerox Corporation, Stamford, Conn.

[21] Appl. No.: 28,372

[22] Filed: Mar. 20, 1987

[51] Int. Cl.⁴ .................. G02B 5/32; G02B 26/10; G03H 1/04
[52] U.S. Cl. .................. 350/3.71; 350/320
[58] Field of Search .................. 350/3.71, 320

[56] References Cited

U.S. PATENT DOCUMENTS 3,561,839  2/1971  McClung et al. .............. 350/3.8
4,289,371  9/1981  Kramer .............. 350/3.71
4,508,421  4/1985  Herloski .............. 350/3.71

FOREIGN PATENT DOCUMENTS 59-17574  1/1984  Japan .............. 350/3.71

Primary Examiner—John K. Corbin
Assistant Examiner—David J. Edmondson

[57] ABSTRACT

A holographic disc for use in a spot scanning system is formed with diffractive gratings having optical power incorporated therein, thereby eliminating the need for an f-theta lens between the disc and the scanning plane. The disc is formed by rotating it at high speeds to achieve gyroscopic stability and then exposing a recording medium to short pulse superimposed wavefronts, one of which imparts optical power to the grating being formed. The gyroscopic stabilization insures that each grating is located exactly the same radial distance from the disc axis.

4 Claims, 1 Drawing Sheet

OPTICAL HOLOGRAPHIC SCANNER

The present invention relates to an optical scanning system and, more particularly, to a system which uses a rotating disc having a plurality of optical diffraction gratings formed around its circumference.

Prior art holographic scanning systems utilizing linear diffraction grating discs are known in the art as exemplified by the system described in U.S. Pat. No. 4,289,371 (Kramer). As shown, a scanning disc has a plurality of holographically-formed plane linear diffraction gratings formed along its circumference. A reconstruction light wavefront incident on the spinner is diffracted therefrom and focused by a lens to form a line at an image plane. These prior art system, when operated within the disclosed range of reconstruction beam wavelength, grating period and incident and diffracted angles, provide a scanning system compensated for the effects of scan line bow and wobble error. The system disclosed in the Kramer patent, under certain specified conditions, is also compensated for the effects of decentration of the gratings; e.g. non-uniform grating-to-grating radial distance from the spinner axis. The non-uniform grating centering results in scan distortion at the image plane. Prior art scan systems also typically use a post-disc lens (referred to as an f-theta lens) to generate constant velocity and straight line raster scans at the image plane. The Kramer patent discloses such a lens generally; U.S. Pat. No. 4,508,421 (Herloski) discloses a specific lens design for a Kramer-type scanning system. It would be desirable to relax the requirements for the scan-linearity lenses by incorporating optical power into the diffraction grating itself. Although this possibility is mentioned in the Kramer patent, as a practical matter such a system (using optical instead of plane diffraction gratings) is very sensitive to location of the gratings with respect to the spinner rotatioal axis; (e.g. the aforementioned decentration problem). The gratings are decentered as a consequence of the current methods for fabricating the gratings. Typically, the spinner is produced by a step and repeat process with the scanner disc mounted on a machine tool. A continuous laser wavefront exposes each holographic facet for the appropriate time (from 0.1 to 30 seconds). In some cases, the original holographic scanning disc can be used to make a master from which many discs are replicated. In current high quality systems, the scanner uses the original. None of these prior art forming methods provide a grating centration adequate for forming optical grating elements.

According to one aspect of the invention, an improved method of making holographic discs is disclosed in which the disc, having photosensitive material disposed in the grating-forming area, is mounted on a shaft and rotated at high speeds to achieve a state of gyroscopic stabilization. The gratings are formed "on the fly" by holographically exposing them to a short laser pulse in an appropriate timed relationship. U.S. Pat. No. 3,561,839 (McClung et al) discloses the use of a "giant pulse laser" which creates a hologram on a stationary, low sensitivity, high resolution recording medium. The laser is operated during a short pulse duration to reduce the exposure time. Since this system is used to form single holograms, the substrate is not rotated and timing relationships are not provided to determine pulse to disc location recording and no disclosure is given as to overcoming centration problems.

More particularly, the invention is directed to an improved method of constructing a holographic disc comprising the steps of:

disposing a photosensitive medium on at least one portion of the disc, rotating the disc about its center axis until gyroscopic stabilization is achieved, identifying the positions on the disc at which optical diffraction gratings are to be formed on said photosensitive medium, firing a laser source to produce a short output pulse following each said position identification, splitting the output pulse into a first object beam and a second reference beam, passing the object beam through an optical device to change the object beam into a non-planar waveform, and recombining the first and second beam at said identified positions thereby forming optical diffraction gratings identically radially spaced from the center axis.

The invention is further directed towards an optical scanning system including a disc having formed thereon at least one optical diffraction grating and further including:

a reconstruction light source which provides a beam of light directed at an angle of incidence $O_i$ to illuminate said grating; and means for rotating said disc so that said grating rotates through an angle and diffracts a portion of the incident light at a cross-scan diffraction angle $O_d$ and a scan angle $O_s$, said grating focusing said diffracted beam onto an image plane to produce a scan line thereon.

Figure 1:
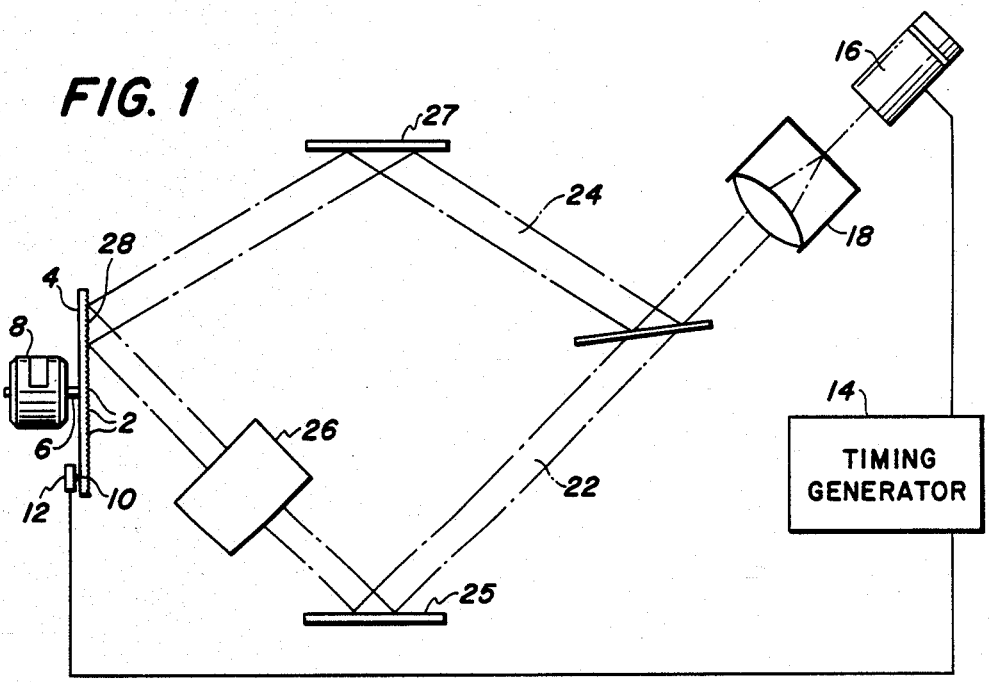
FIG. 1 shows a dynamic holographic exposure system for fabricating a holographic disc with optical diffraction gratings.

Turning now to FIG. 1, the holographic formation of a plurality of optical diffraction gratings 2 on the surface of a transmission type spinner 4 is shown. In operation, disc 4 is mounted on a shaft 6 driven by a motor 8. The disc is rotated at a speed sufficient to achieve gyroscopic stabilization. A timing mark 10 on the motor side of the disc serves to provide a reference position which is periodically detected by position encoder 12. This position signal is sent to timing generator 14. Generator 14 contains circuitry to provide a firing signal to a laser source 16 sufficient to periodically cause a short pulse output which is used to form each optical diffraction grating, as further described below. Laser source 16 generates a pulsed coherent wavefront which is expanded by telescope 18 and split into two wavefronts by beam splitter 20. An object wavefront 22 and a reference wavefront 24 are thereby formed. The object waveform 22 is reflected from mirror 25 and passes through an optical device 26 (which may be a lens combination chosen to form the desired non-planar object waveform) and is recombined with reference wavefront 24 (reflected from mirror 27) on a portion of a recording medium 28 disposed along the periphery of disc 4. Material 28 is a photoresist or other photosensitive material whose properties are determined primarily by the resolution required to record the fringes of the interfering wavefronts. The gratings formed by the combined exposures will be an optical diffraction grating having optical properties imparted by device 26. The location of each successive grating along the spinner periphery will be identified by subsequent outputs from encoder 12 followed by generation of the pulsed output via timing generator 14.

In one preferred embodiment, a 10-facet disc was formed, the disc having a radius to the center of the grating of 5 cm. The discs were formed with a primary grating period of $4.5 \times 10^{-5}$ (0.45 m, 2,200 lines/mm). Rotational disc speed was 36,000 rpm. For a nominal timing accuracy for the firing of the laser of $10^{-8}$ sec, the facets were placed on the disc to an accuracy of $2 \times 10^{-4}$ cm (2 m). To allow for no more then 1% blurring of the hologram during exposure, the pulse duration is approximately 25 psec ($25 \times 10^{-12}$ sec) a pulse width realizable with a laser source such as a modelocking dye laser. This is an optimum pulse value. It is believed that gyroscopic stabilization of the disc might be achieved at just a few thousand rpm which would relax the laser pulse to approximately 250 psec. For some systems which can accommodate a greater amount of blurring while maintaining desired resolution, a 1 nsec pulse generated, for example, by a high power gas discharge laser, would be enabling.

To summarize the above making process, a recording medium on the surface of a disc rotated at a speed sufficient to achieve a state of gyroscopic stabilization, is exposed to a succession of short laser pulses. The laser pulses are conditioned, split and recombined with the object wavefront, the object wavefront passing through an optical device changing the object wavefront from a planar to a non-planar wave. The exposure at the recording medium results in an optical grating formed with a degree of power incorporated therein. Since the rotating disc is precisely vertically oriented because of the high rotational speed, each grating is formed at precisely the same radial distance from the disc axis thereby eliminating decentration non-uniformities.

Figure 2:
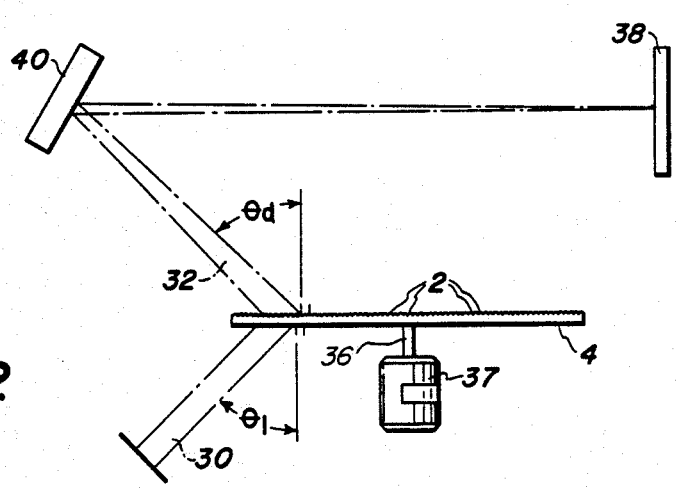
FIG. 2 is a schematic representation of a scan system utilizing the disc formed by the exposure process of FIG. 1.

Turning next to FIG. 2, there is shown a scanning system utilizing a transmission-type holographic disc formed according to the method described above. A reconstruction wavefront 30, which can be, for example, a coherent laser output, is incident on spinner 4 at an angle $O_i$ and is diffracted at an angle $O_d$. The output wave 32 is both diffracted and focused by each of gratings 2 formed according to the process described above. As the disc is rotated about shaft 36 by motor 37, each grating 2 is rotated through wavefront 30 at some angle, causing rotation of the diffracted wavefront. The focal position of output beam 32 will be displaced vertically, producing a single line scan 36 at image plane 38 lying in the focal plane of the gratings. The output undergoes one reflection from mirror 40 and because of the use of optical diffraction gratings on the disc, does not require an f-theta lens between the disc and the image plane. As additional gratings are rotated through wavefront 30, additional scan lines are generated. These scan lines can be made almost completely bowfree and invariant to wobble caused by spinner rotation by appropriate selection of the values of $\theta_i$, $\theta_d$, and the ratio of the wavelength of the reconstruction beam to the grating period, as taught by the Kramer patent, whose contents are hereby incorporated by reference.

Although the above system describes a lensless image side system, the present invention may also be used in scanning systems which include various correctional lens elements such as non-planar mirrors and lenses. For these systems, the optical properties of the gratings will be selected to complement properties of the other optical elements.

While the invention has been described with reference to the structure disclosed, it is not confined to the details set forth. For example, while transmission gratings are shown in the described embodiment, the invention can also be practised with reflection-type gratings. The invention is intended to cover such modifications or changes as may come within the scope of the following claims:

What is claimed is:

1. An improved method of making a holographic disc comprising the steps of: disposing a photosensitive medium on at least one portion of the disc; rotating the disc about its center axis until gyroscopic stabilization is achieved; identifying the positions on the disc at which optical diffraction gratings are to be formed on said photosensitive medium; firing a laser source to produce a short output pulse following each sid position identification; splitting the output pulse into a first object beam and a second reference beam; passing the object beam through an optical device to change the object beam into a non-planar waveform; and recombining the first and second beam at said identified positions thereby forming optical diffraction gratings identically spaced from the center axis and having optical power incorporated therein.

2. A holographic disc made according to the method of claim 1.

3. The method of claim 1 wherein the laser output pulse is within a range approximating 1 nsec to 25 psec.

4. A holographic disc made according to the method of claim 2.

* * * * *